(12) United States Patent
Chi et al.

(10) Patent No.: US 7,673,019 B2
(45) Date of Patent: Mar. 2, 2010

(54) SYSTEM AND METHOD FOR DETERMINING A QUANTITATIVE MEASURE OF QUALITATIVE USABILITY OF RELATED WEB PAGES

(75) Inventors: Ed H. Chi, Palo Alto, CA (US); Christopher Olston, Pittsburgh, PA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 912 days.

(21) Appl. No.: 11/266,971

(22) Filed: Nov. 4, 2005

(65) Prior Publication Data

US 2007/0106758 A1    May 10, 2007

(51) Int. Cl.
  *G06F 15/16* (2006.01)
(52) U.S. Cl. ............... 709/219; 709/203; 709/244; 715/205; 715/206; 707/4; 707/5; 707/204
(58) Field of Classification Search ............ 707/3
  See application file for complete search history.

(56) References Cited

U.S. PATENT DOCUMENTS

| | | | | |
|---|---|---|---|---|
| 5,835,905 A * | 11/1998 | Pirolli et al. | | 707/3 |
| 5,895,470 A * | 4/1999 | Pirolli et al. | | 707/102 |
| 6,115,718 A * | 9/2000 | Huberman et al. | | 707/102 |
| 6,182,091 B1 * | 1/2001 | Pitkow et al. | | 715/206 |
| 6,549,896 B1 * | 4/2003 | Candan et al. | | 707/2 |
| 6,636,848 B1 * | 10/2003 | Aridor et al. | | 707/3 |
| 6,671,711 B1 * | 12/2003 | Pirolli et al. | | 709/200 |
| 2003/0195944 A1 * | 10/2003 | Chi et al. | | 709/218 |
| 2005/0216533 A1 * | 9/2005 | Berkhin | | 707/204 |
| 2006/0122998 A1 * | 6/2006 | Bar-Yossef et al. | | 707/5 |

OTHER PUBLICATIONS

D. Gourley et al., "HTTP The Definite Guide," Ch. 1, pp. 3-22, O'Reilly and Assoc. (2002).
W. R. Stevens, "TCP/IP Illustrated," vol. 1, Ch.1 et seq., Addison-Wesley (1994).
T. Cormen et al., "Introduction to Algorithms," Ch. 25, pp. 514-531, The MIT Press (1990).

* cited by examiner

*Primary Examiner*—Firmin Backer
*Assistant Examiner*—Natisha Cox
(74) *Attorney, Agent, or Firm*—Patrick J. S. Inouye; Scott E. Smith

(57) ABSTRACT

A system and method for determining a quantitative measure of qualitative usability of related Web pages. Web pages are accepted that each include at least one hyperlink referencing and proximal cues relating to distal content included in another Web page. An information goal identifying a target Web page is specified. An activation network is formed. A directed graph including nodes corresponding to the Web pages and arcs corresponding to the hyperlinks is built. A weight is assigned to each arc to represent a probability of traversal of the corresponding hyperlink based on a relatedness of keywords in the information goal to the proximal cues included in the referenced Web page. A traversal through the activation network to the node corresponding to the target Web page is evaluated as a quantitative measure of usability.

20 Claims, 6 Drawing Sheets

20

SYSTEM AND METHOD FOR DETERMINING A QUANTITATIVE MEASURE OF QUALITATIVE USABILITY OF RELATED WEB PAGES

The U.S. Government has a paid-up license in this invention and the right in limited circumstances to require the patent owner to license others on reasonable terms as provided by the terms of Contract No. N00014-96-C-0097 awarded by the Office of Naval Research.

FIELD

This application relates in general to Web site evaluation and, in particular, to a system and method for determining a quantitative measure of qualitative usability of related Web pages.

BACKGROUND

The Worldwide Web, or simply, the "Web," has become a form of global information resource that can be easily accessed with just a Web browser and a connection to a wide area internetnetwork, particularly, the Internet. Generally, individual pages of Web content are freely available for browsing and can contain both static and interactive content of multiple media types, particularly, textual and visual content. Web content can be navigated through a read, point, and click procedure to "surf" through successive Web pages to satisfy an information goal. Typically, collections of related Web pages are structured into a hierarchical Web site through hyperlinks that associate distal information contained in a linked Web page through proximal cues contained in the linking Web page.

By virtue of the wide spread acceptance enjoyed by the Web, individuals, businesses, and other interests are placing increasing reliance on the Web as a major means of communication, particularly in the commercial sector where effective advertising, information dissemination, and collaborative data sharing are necessary aspects of electronic commerce. Ensuring user satisfaction is crucial, particularly where revenue is derived, for instance, through advertising for third parties, and where generating traffic through repeat visits is tied to revenue goals.

However, user satisfaction in browsing a particular Web page is subjective. Indirect measures for gauging user satisfaction include capturing click patterns and counting repeat visits, but such measures only provide generalized indications of potential interest level in the Web content. Observable indicia, such as clicks, are not tied to an objective measure of goodness or satisfaction and could equally reflect a random or wrong choice by the user. Similarly, user satisfaction in browsing an entire Web site is also subjective. Click patterns can be traced to identify the most popular hyperlinks, but such measures fail to reflect whether users were satisfied with the results of their visit. Quantifying user satisfaction therefore requires assigning meaning to user actions.

User satisfaction on per page and entire Web site bases can be quantified by tying user satisfaction to an information need or goal. Generally, users visiting a Web site are looking for particular information and will stop searching when either the information is found through page-by-page navigation, a dead end or wrong result is reached, or they give up in their search. Accordingly, user satisfaction can be quantitatively measured by determining whether user information needs are being satisfied by the Web site.

Conventional Web site quantitative evaluation focuses on performing traffic analyses. Individual visits are traced and repeat visits are tracked to generate statistics on Web site traffic. Although these measures provide a general idea of user behaviors, such information fails to provide an indication of whether user information needs were met or how a Web site might be improved through modified structuring and proximal cues.

Therefore, there is a need for an approach to providing quantitative measures of the goodness of a Web site based on a priori user information needs. Preferably, such an approach would provide an upper bound on the potential goodness of a Web site effected through changes in hyperlink structure and information cues.

SUMMARY

A system and method provide usability testing of a Web site by determining a quantitative metric reflecting qualitative user satisfaction. The metric can serve as an upper bound on potential improvements to the hyperlink topology and information cues in the individual Web pages. In one embodiment, simulated users follow the most highly scented hyperlinks by application of a form of greedy algorithm. An information "scent" is determined based upon a comparison of an information goal containing weighted keywords and the information cues associated with each hyperlink. The information scent reflects the probability that a particular hyperlink would be selected in light of the information goal. The highest scented hyperlinks, that is, highest valued probabilities, are followed through iterative traffic flow simulation to generate a quantified activation vector. In a further embodiment, the simulated users follow the best hyperlinks by application of a form of shortest path algorithm. Each information scent is determined by inverting the normalized information scent probabilities for each hyperlink and choosing the shortest path to a target Web page. The best hyperlinks are followed through iterative traffic flow simulation to generate a qualified activation vector. The resulting activation vectors can be used to provide upper bounds on possible improvements to Web page topology and information cue content.

One embodiment provides a system and method for determining a quantitative measure of qualitative usability of related Web pages. Web pages are accepted that each include at least one hyperlink referencing and proximal cues relating to distal content included in another Web page. An information goal identifying a target Web page is specified. An activation network is formed. A directed graph including nodes corresponding to the Web pages and arcs corresponding to the hyperlinks is built. A weight is assigned to each arc to represent a probability of traversal of the corresponding hyperlink based on a relatedness of keywords in the information goal to the proximal cues included in the referenced Web page. A traversal through the activation network to the node corresponding to the target Web page is evaluated as a quantitative measure of usability.

A further embodiment provides a system and method for determining a quantitative measure of qualitative usability of Web pages in a Web site. A Web site including a plurality of Web pages is accepted. Each Web page includes content and at least one hyperlink references another Web page with proximal cues relating to distal content included in the another Web page. An information goal including one or more keywords is specified and a target Web page from among the Web pages in the Web site is identified. A logically-defined activation network is formed. A directed graph is built with nodes corresponding to the Web pages and arcs corresponding to the hyperlinks between the Web pages. A weight is assigned to each arc to represent a probability of traversal of the corresponding hyperlink based on a relatedness of keywords in the information goal to the proximal cues included in the referenced Web page. A traversal through the activation network to the node corresponding to the target Web page is evaluated as a quantitative measure of usability, wherein the quantitative measure is determined in accordance with at least one equation selected from the set, comprising:

$$A_i = A_{i-1} \cdot S;$$

$$A_i = \alpha A_{i-1} \cdot S; \text{ and}$$

$$A_i = A_{i-1} \cdot S + E$$

where S is a starting activation vector representing the activation network, $A_i$ is a successive activation vector determined after i traversals, $\alpha$ is a decay factor, and E is a growth constant.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit the scope of the present invention. Accordingly, the drawings and detailed description are to be regarded as illustrative in nature and not as restrictive.

DETAILED DESCRIPTION

Web Site Usability Evaluation Environment

Figure 1:
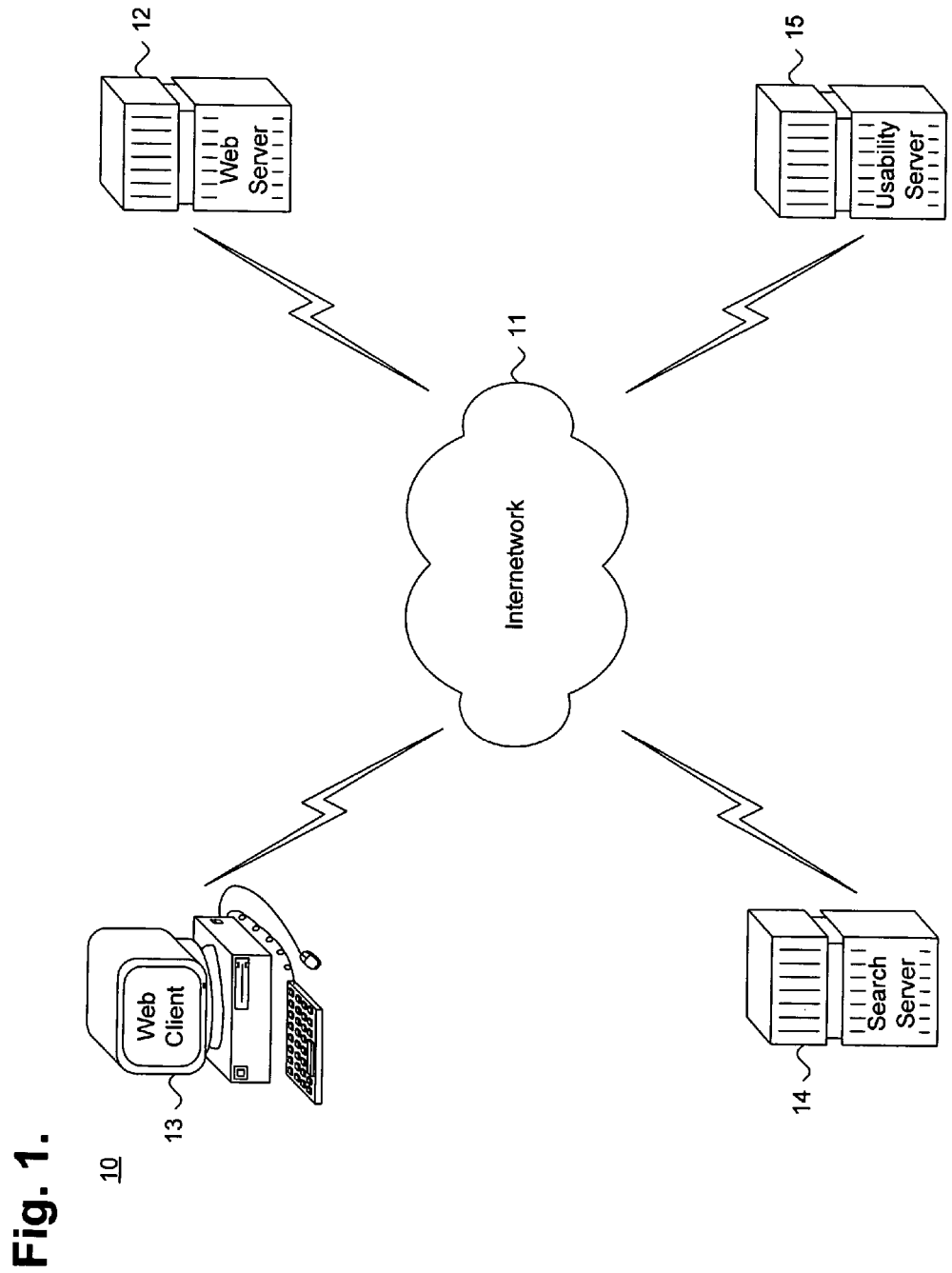
FIG. 1 is a block diagram showing an environment for evaluating the usability of related Web pages.

A Web site is a logical collection of individual Web pages that are connected by unidirectional hyperlinks. Each Web page presents content, which can be static or interactive, of multiple media types, particularly textual and visual content. The usability of the pages in a Web site is tied to user satisfaction, which can be quantified by assigning meaning to user actions. FIG. 1 is a block diagram showing an environment 10 for evaluating the usability of related Web pages. The Web site is remotely accessed over an internetwork 11, particularly, the Internet, through a Web server 12 that serves each Web page upon request by a Web client 13. Each Web page is written in a suitable variant of a hypertext markup language, for instance, the Hypertext Markup Language (HTML), such as described in D. Gourley and B. Totty, "HTTP The Definitive Guide," Ch. 1, pp. 3-22, O'Reilly and Assocs. (2002), the disclosure of which is incorporated by reference. Additionally, the internetwork 11 is preferably a Transmission Control Protocol/Internet Protocol (TCP/IP) compliant network, such as described in W. R. Stevens, "TCP/IP Illustrated," Vol. 1, Ch. 1 et seq., Addison-Wesley (1994), the disclosure of which is incorporated by reference.

Generally, users visiting a Web site are looking for particular information to satisfy an information need or goal. The Web pages that form a Web site are logically structured into a hierarchy that is navigated through embedded hyperlinks, as further described below with reference to FIG. 2. Each hyperlink leads to further Web content, generally on another Web page. User selection of hyperlinks is guided through proximal cues that provide context surrounding each hyperlink in relation to the Web content provided by the referenced Web page as distal information. Users generally stop searching when either their information goal is satisfied, a dead end or wrong result is reached, or they give up. The loss of users from a Web site is known as the attrition rate.

While each hyperlink provides a direct reference to another Web page, proximal cues can be supplemented by search tools, such as provided by a search server 14, which can accept a query containing one or more keywords to describe an information goal.

Finally, searching efficiency can be evaluated by a usability server 15 that, for example, determines a quantitative measure of search efficiency of a Web site, such as described in commonly-assigned U.S. Patent application, entitled "System and Method for Determining a Quantitative Measure of Search Efficiency of Related Web Pages," Ser. No. 11/267,004, filed Nov. 4, 2005, pending, the disclosure of which is incorporated by reference.

In one embodiment, the Web server 11, Web client 13, search server 14, and usability server 15 are general purpose, programmed digital computing devices that are capable of multi-threaded execution and which include a central processing unit (CPU), random access memory, non-volatile secondary storage, such as a hard drive or CD ROM drive, interfaces to a wired or wireless network, and various peripheral devices, including user interfacing means, such as a keyboard and display. Program code, including software programs, and data is loaded into the memory for execution and processing by the CPU and results are generated for display, output, transmittal, or storage.

Web Page Hierarchy

Figure 2:
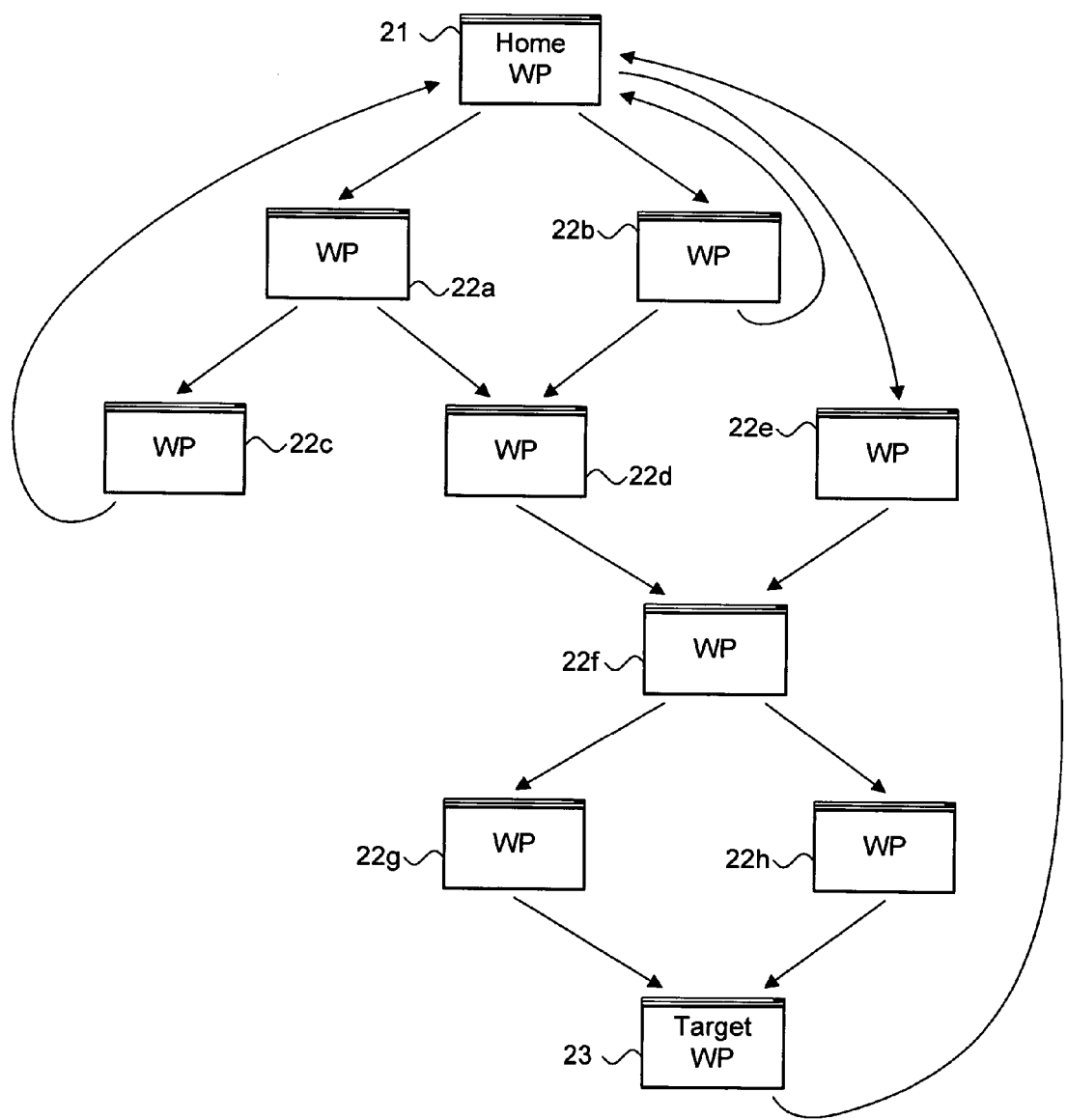
FIG. 2 is a tree diagram showing, by way of example, a hierarchy of Web pages for providing Web content in the environment of FIG. 1.

For simplicity, Web sites are generally structured into a hierarchy that proceeds from a home Web page, frequently identified by a Uniform Resource Locator (URL) provided as the domain name. FIG. 2 is a tree diagram showing, by way of example, a hierarchy 20 of Web pages for providing Web content in the environment 10 of FIG. 1. Other types of Web site structuring are possible, but, in terms of usability, hierarchies are user friendly and more easily navigated and understood than other structuring forms.

The hierarchy 20 represents a Web site that includes a home Web page 21 and a target Web page 23, between which zero or more intermediate Web pages 22a-h appear. Each Web page includes content and at least one hyperlink referencing another Web page, either within or outside of the Web site. Through a point-and-click procedure, a user can navigate through the Web site by selecting a hyperlink based on proximal cues to retrieve the distal content contained in the referenced Web page. Each hyperlink is unidirectional and, for purposes of illustration, any terminal Web page not corresponding to the target Web page 23 references back to the home Web page 21.

User satisfaction depends upon whether information needs can be satisfied by a Web site. Usability is affected by ease of navigation. As any given Web page can be referenced by one or more referring Web pages, multiple paths through the hierarchy 20 to the target Web page 23 are possible. However, not every path through the hierarchy 20 provides the best path to the target Web page 23 from the home Web page 21. The proximal cues contained in referring Web pages and the topology of the Web site can affect qualitative usability the Web site and user satisfaction can be simulated to determine an upper bound on improvements contributing to usability, as further described below with reference to FIG. 5.

Home and Target Web Pages

Figure 3:
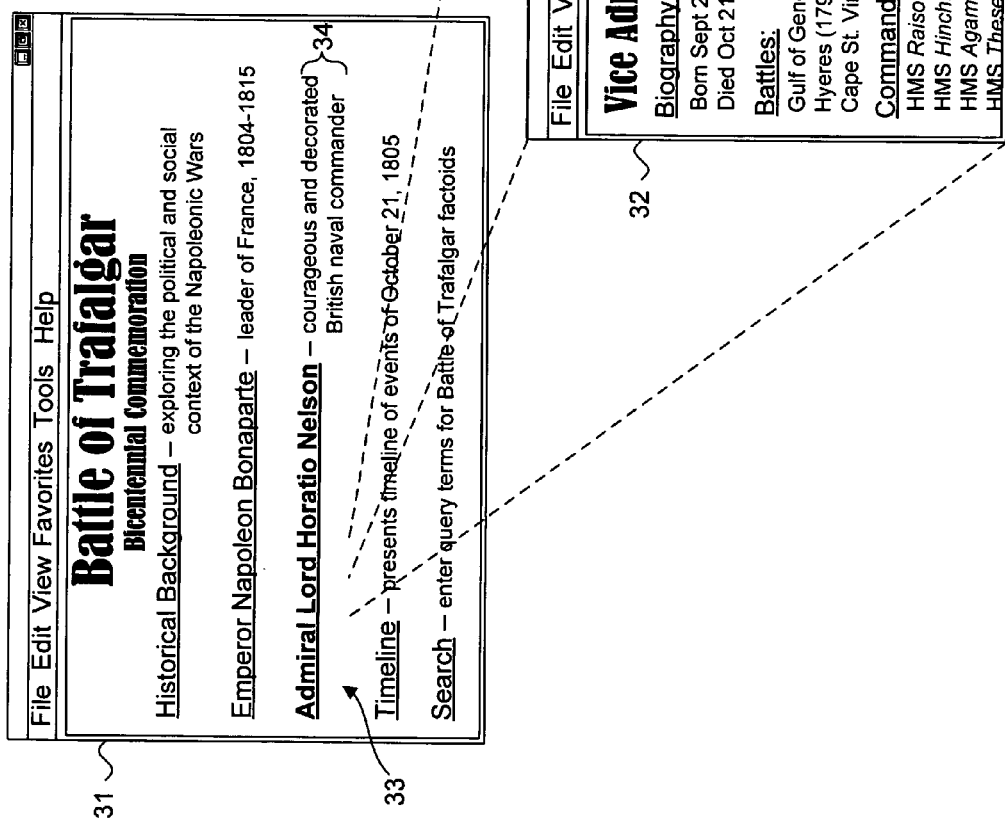
FIG. 3 is a screen diagram showing, by way of example, the home and target Web pages of the Web page hierarchy of FIG. 2.

In one embodiment, user satisfaction of a Web page can be quantified by determining an information scent that measures a user's perception of the value and cost of accessing a particular piece of information. FIG. 3 is a screen diagram 30 showing, by way of example, the home and target Web pages 31, 32 of the Web page hierarchy 20 of FIG. 2. Each Web page can include one or more hyperlinks. For example, the home Web page 31 includes a hyperlink 33 that references target Web page 32. Each Web page also includes content and proximal cues 34 associated with each hyperlink 33 to describe the content, known as distal information 35, that can be found on the Web page referenced by the hyperlink 33.

Weighted Keywords Vector

Figure 4:
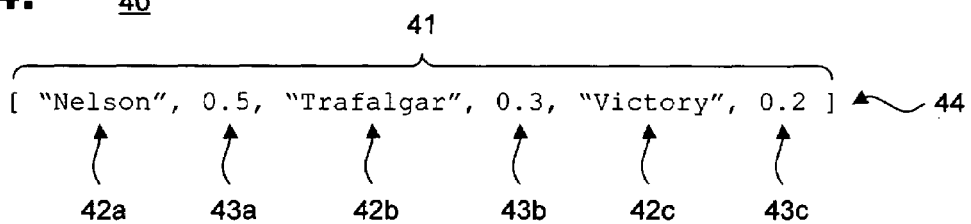
FIG. 4 is a diagram showing, by way of example, a vector of weighted keywords for application against the Web page hierarchy of FIG. 2.

In one embodiment, the usability of the Web pages in a Web site is determined by evaluating the quantified ability of a simulated user to satisfy an information goal. FIG. 4 is a diagram 40 showing, by way of example, a vector 41 of weighted keywords 42a-c for application against the Web page hierarchy 20 of FIG. 2. The vector 41 represents the information goal against which the usability of the Web site will be quantified to reflect a user's qualitative satisfaction of each Web site visited. The vector 41 contains one or more keywords 42a-c and an associated weight 43a-c to signify the relative importance of each keyword.

Activation Network

Figure 5:
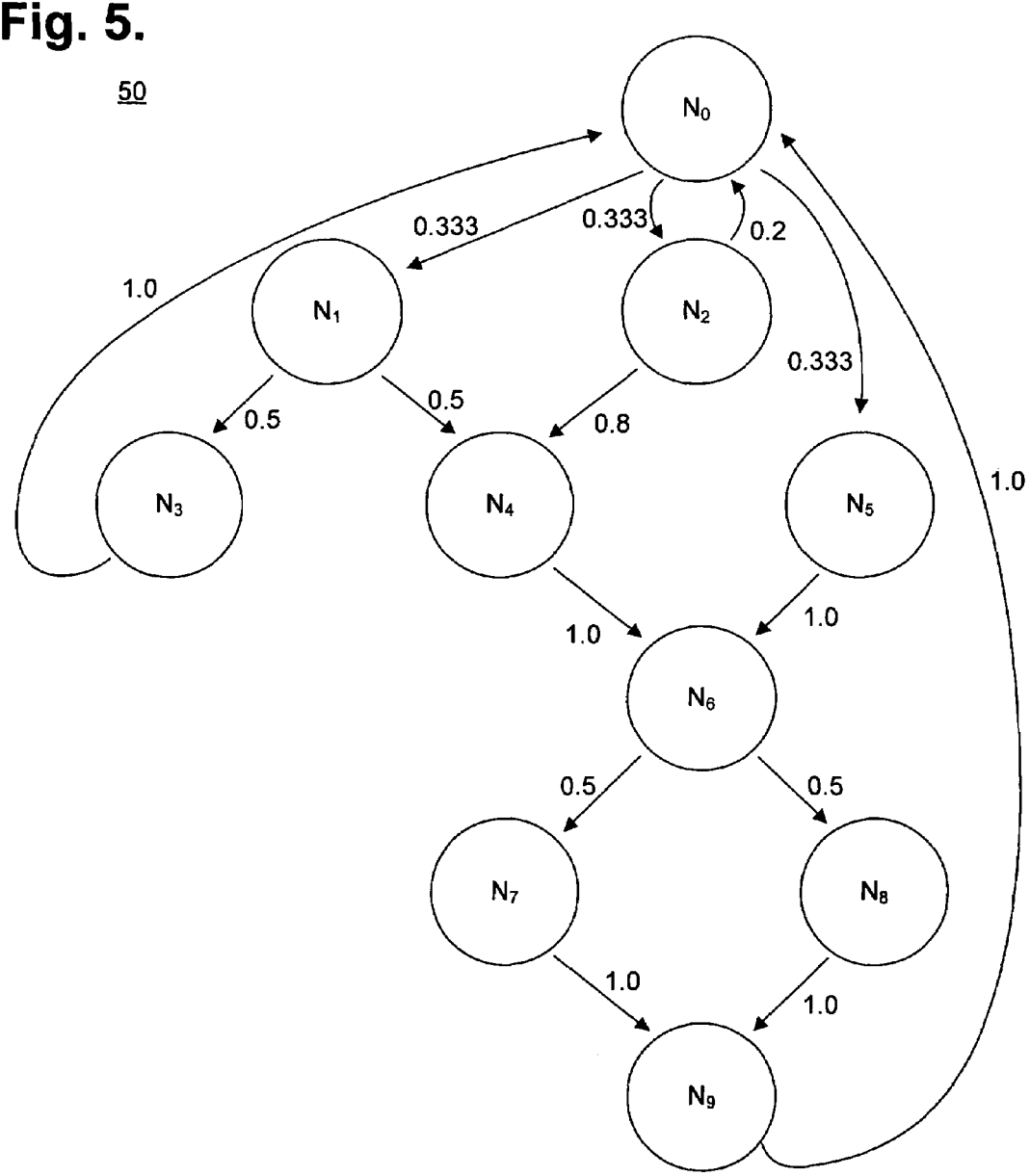
FIG. 5 is a tree diagram showing, by way of example, an activation network of the Web page hierarchy of FIG. 2.

For each Web page, the weighted keywords vector 41 is applied to determine the likelihoods of a user traversing each hyperlink. FIG. 5 is a tree diagram showing, by way of example, an activation network 50 of the Web page hierarchy 20 of FIG. 2. The degree of similarity between the proximal cues 34 associated with the hyperlinks on each Web page and an information goal 44 is known as an information scent, which represents the likelihood of a user selecting the hyperlink.

The information scents for an entire Web site can be mapped into an activation network 50 of probabilities for use in simulating user traffic flow through the Web site based upon the information goal 44, such as described in commonly-assigned U.S. patent application Publication No. 2003/0195944, published Oct. 16, 2003, pending, the disclosure of which is incorporated by reference. The activation network 50 is a directed graph with arcs representing each hyperlink drawn from a referencing Web page to a referenced Web page. Each Web page in the Web site being mapped has a corresponding node $N_i$ in the activation network 50. The probability of a user selecting a particular hyperlink in light of their information goal is represented as a weight assigned to the corresponding arc in the activation network 50. For instance, the node $N_0$ represents a home Web page and the nodes $N_1$, $N_2$, and $N_5$, each have an equal probability of being selected. For purposes of illustration, no sinks, that is, dead-end terminal nodes, are allowed and an arc to the top-most node $N_0$ is provided to represent a hyperlink referencing back to the home Web page. Other forms of mapping the probabilistic behaviors of users are possible.

The activation network 50 is a form of Bayesian probabilistic network that can be represented mathematically as a two-dimensional activation vector. The individual nodes $N_i$ are represented along each dimension of the activation vector. Each row represents a starting node and each column represents a destination node. The information scent, that is, the probability of a user traveling along a particular arc in the activation network 50, is entered as a value in the activation vector. The activation vector is also referred to as the scent matrix S. The activation vector for the activation network 50 can be expressed as:

$$\begin{bmatrix} 0.000 & 0.333 & 0.333 & \ldots & \ldots & \ldots & 0.000 \\ 0.000 & 0.000 & 0.000 & \ldots & \ldots & \ldots & 0.000 \\ 0.000 & 0.200 & 0.000 & \ldots & \ldots & \ldots & 0.000 \\ \vdots & \ldots & \ldots & \ldots & \ldots & \ldots & \vdots \\ \vdots & \ldots & \ldots & \ldots & \ldots & \ldots & \vdots \\ \vdots & \ldots & \ldots & \ldots & \ldots & \ldots & \vdots \\ 1.000 & 0.000 & \ldots & \ldots & \ldots & \ldots & 0.000 \end{bmatrix}$$

A traversal through the activation network 50, representing "surfing" of the corresponding Web site, can be simulated through matrix multiplication. The starting point within the activation network 50 corresponding to the starting, frequently home, Web page is expressed as an entry vector $\vec{E}$, with the value 1.0 in the position of the starting point. For example, entry vector $\vec{E}$ for a starting point in the activation network 50 corresponding to the home Web page 21 (shown in FIG. 2) can be expressed as:

$$\begin{bmatrix} 1.000 \\ 0.000 \\ 0.000 \\ \vdots \\ \vdots \\ \vdots \\ 0.000 \end{bmatrix}$$

The scent matrix S is multiplied by the entry vector $\vec{E}$ to obtain an activation vector $A_1$, which simulates the selection of a single hyperlink in the Web site. The spreading activation for each successive selection can be simulated by multiplying the scent matrix S by successive activation vectors $A_i$. The cumulative user satisfaction surfing through a Web site can be determined by taking a summation over each activation vector $A_i$, which can be expressed as:

$$A_i = A_{i-1} \cdot S$$

User attrition from the Web site can be simulated by multiplying each activation vector $A_i$ by a constant decay factor $\alpha$, which can be expressed as:

$$A_i = \alpha A_{i-1} \cdot S$$

Finally, new users "entering" the Web site can be simulated by adding a growth constant E to each activation vector result, which can be expressed as:

$$A_i = \alpha A_{i-1} \cdot S + E$$

Following user traffic flow simulation, the resulting activation vector $A_n$ specifies the number of users at each node after n selections. Simulating those users that have reached a particular target Web page 23 can be simulated by zeroing out the row in the scent matrix S corresponding to the node $N_i$ in the activation network 50 that represents the target Web page 23. Other forms of simulating user traffic flow is possible.

Process Flow Diagram

Figure 6:
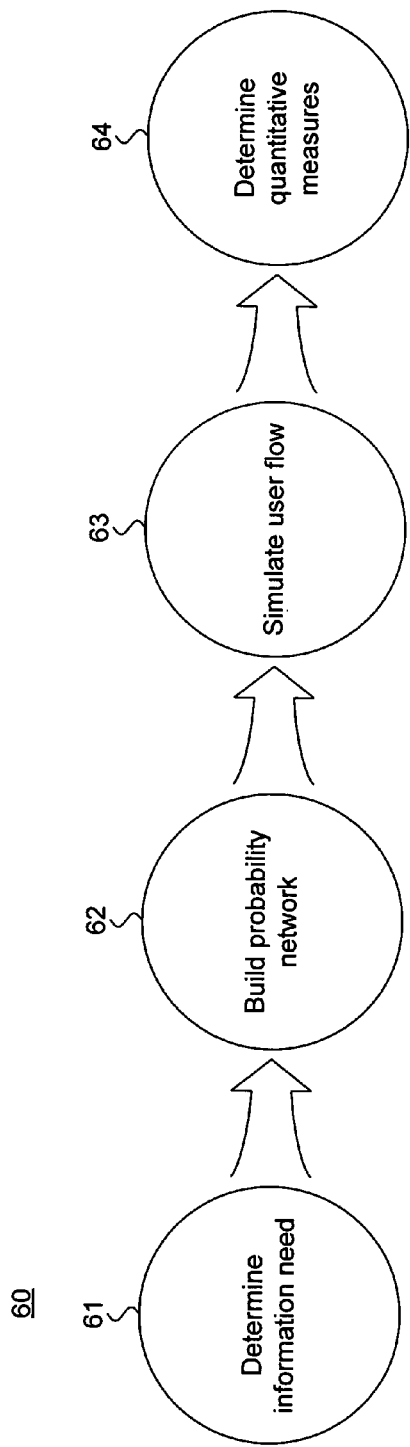
FIG. 6 is a process flow diagram showing a method for determining a quantitative measure of qualitative usability of related Web pages, in accordance with one embodiment.

An information scent defines a single metric that measures the cumulative satisfaction of simulated users looking for a specific information goal on a Web site. However, the overall user satisfaction for a Web site involves a broader examination of the topology of hyperlink structures and the effectiveness of information cues provided on each Web page. FIG. 6 is a process flow diagram showing a method for determining a quantitative measure of qualitative usability of related Web pages 60, in accordance with one embodiment. The process 60 generates a metric for comparison to the cumulative satisfaction findings for specific information goals as an upper bound on improving the topology of the hyperlink structures and information cues used in individual Web pages in a Web site. The metric is determined as if users had perfect knowledge of the entire Web site and would know the exact route to follow to find the best Web pages to satisfy their information needs.

The metric measures the amount of information scent absorbed by simulated users navigating based on perfect knowledge of the Web site. Initially, an information need or goal is determined as a vector of weighted keywords (process 61), such as described above with reference to FIG. 4. A probability network representing an activation network of the Web page hierarchy is built (operation 62), such as described above with reference to FIG. 5. User traffic flow through the Web site is then simulated (operation 63), such as described in commonly-assigned U.S. patent application Publication No. 2003/0195944, published Oct. 16, 2003, pending, the disclosure of which is incorporated by reference. In one embodiment, the simulated users follow the most highly scented hyperlink at each Web page, as further described below with reference to FIG. 7. In a further embodiment, the simulated users decide at each stage to follow the best hyperlink that would lead to the target Web page, as further described below with reference to FIG. 8. The best hyperlink is not necessarily the same hyperlink that has the strongest information scent, as the latter could ultimately lead to a non-target Web page. Finally, quantitative measures in the form of an activation vector $A_i$ are determined (operation 64), which can be used for comparison as an upper bound to specific information goal cumulative satisfaction measures.

Information Scent Absorption Rate Using Ideal Scent

Figure 7:
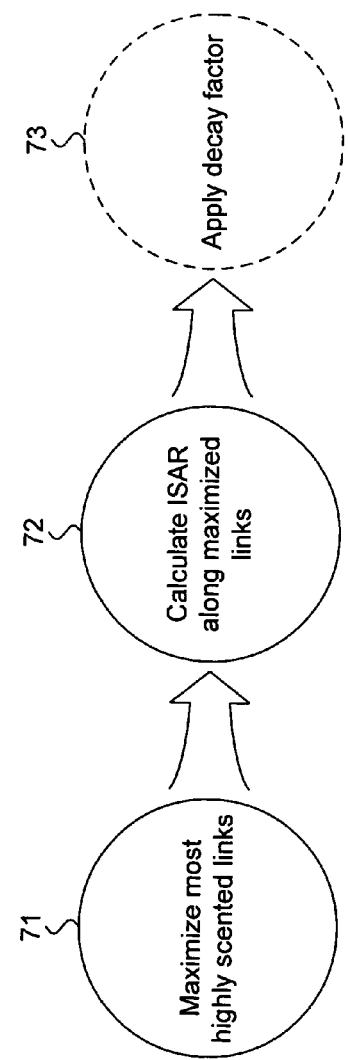
FIG. 7 is a process flow diagram showing determination of an information scent absorption rate using ideal scent for use with the method of FIG. 6.

In one embodiment, a metric, known as the ideal scent absorption rate, is determined using an ideal scent in place of the individual probabilities reflecting the likelihood of a user following a particular hyperlink. FIG. 7 is a process flow diagram showing determination of an information scent absorption rate using ideal scent 70 for use with the process 60 of FIG. 6. The ideal scent absorption rate is determined by applying a form of greedy algorithm to cause simulated users to always follow the most highly scented hyperlink, even if a particular hyperlink does not necessarily lead to the target Web page. Consequently, the path of the simulated users could fall off course, indicating a possible need for a restructuring of the hyperlink topology of the Web site or better proximal cues to better meet user information goals.

Initially, the individual probabilities for each node in the activation network 50 are determined and the most highly scented hyperlinks are maximized (operation 71). In one embodiment, the probabilities for the most highly scented links are set to 1.0 and the remaining entries are set to 0.0. In the event of a tie, the hyperlinks are divided pro-rata over 1.0. User traffic flow is simulated to calculate the ideal scent absorption rate along the maximized hyperlinks (operation 72). In a further embodiment, a decay factor can be introduced to simulate user attrition by introducing a constant to each iteration (operation 73).

Information Scent Absorption Rate Using Ideal Scent Towards Target

Figure 8:
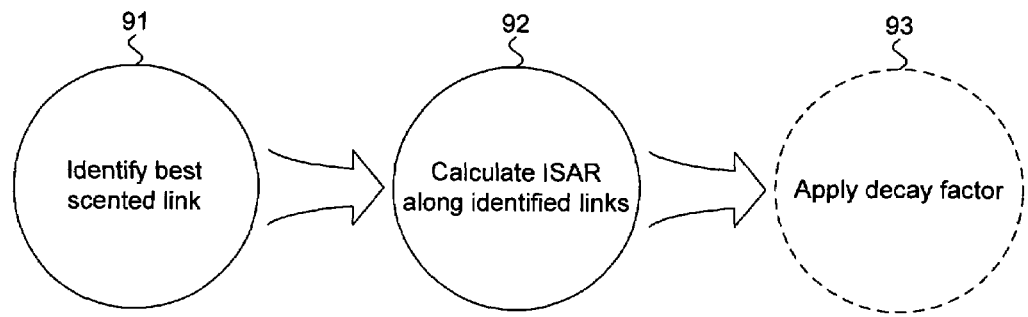
FIG. 8 is a process flow diagram showing determination of an information scent absorption rate using ideal scent towards target for use with the method of FIG. 6.

In a further embodiment, the simulated users are assigned knowledge of the best scented path through a Web site that leads to a target Web page. The information scents assigned to those Web pages that do not ultimately lead to the target Web page are discounted and, as a result, the best hyperlink selected at each step may not necessarily be the same hyperlink that has the strongest information scent. FIG. 8 is a process flow diagram showing determination of an information scent absorption rate using ideal scent towards target for use with the process 60 of FIG. 6. In one embodiment, the path is determined using a single-source shortest path algorithm, such as described in T. Cormen, "Introduction To Algorithms," Ch. 25, pp. 514-531, The MIT Press (1990), the disclosure of which is incorporated by reference. Other types of shortest path algorithms could also be used.

When applying a minimally weighted path determination methodology, such as the single source shortest path algorithm, the probabilities for each hyperlink must be reversed because the algorithm is designed to minimize rather than to maximize the value of the weighted path. Thus, each probability is subtracted from 1.0 and the resulting values are applied in order of increasing value to identify the shortest path through the activation network 50 (operation 91). The information scent absorption rate is then calculated by propagating simulated user traffic flow along the path (operation 92) using the original probabilities. In a further embodiment, a decay factor can be applied to simulate user attrition by introducing a constant to each iteration (operation 93).

System Diagram

Figure 9:
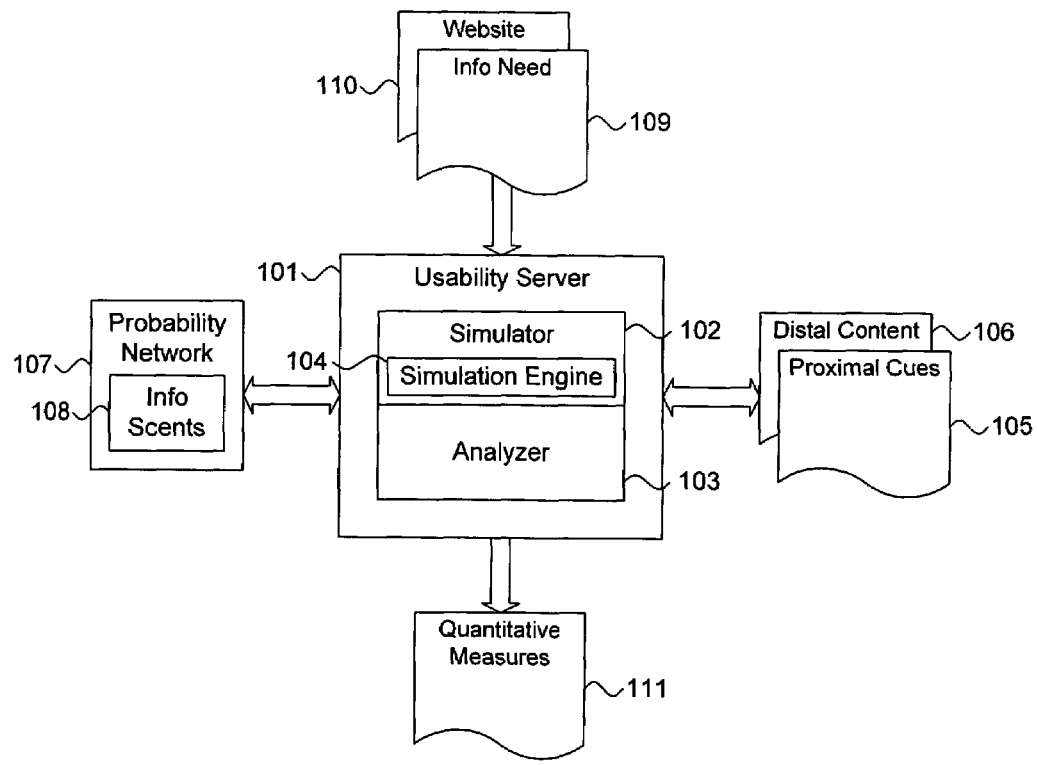
FIG. 9 is a functional block diagram showing a system for determining a quantitative measure of qualitative usability of related Web pages, in accordance with one embodiment.

A usability server can be used to automatically infer the usability of the Web pages in a Web site by simulating users surfing for specific information goals to generate quantitative usability metrics. FIG. 9 is a functional block diagram 100 showing a system for determining a quantitative measure of qualitative usability of related Web pages, in accordance with one embodiment. A usability server 101 can be implemented as part of or separately from a Web server. The usability server 101 executes a sequence of programmed process steps, such as described above with reference to FIG. 6, implemented, for instance, on a programmed digital computer system.

The usability server 101 includes a simulator 102 and analyzer 103. Other modules are possible. The simulator 102 includes a simulation engine 104 for simulating user flow through a Web site 110 accompanied by an information need 109 that the simulation engine 104 seeks to fulfill. The Web site 110 includes a set of two or more Web pages that each include content and contain one or more hyperlinks referencing at least one other Web page.

The analyzer 103 generates quantitative measures 111 based on an analysis of the usability of the Web site 110 through user traffic flow simulation performed by the simulator 102. Information in each Web page accompanying each hyperlink is identified as proximal cues 105, which are associated with distal content 106 contained on the referenced Web page. The proximal cues 105 are compared against the information need 109 to generate information scents 108 that represent the probability that a simulated user would select a particular hyperlink. The set of information scents 108 can be formed into a probability network 107, through which user traffic flow can be simulated and quantitative measures 111 generated in the form of an activation vector $A_i$, such as further described above with reference to FIG. 5.

While the invention has been particularly shown and described as referenced to the embodiments thereof, those skilled in the art will understand that the foregoing and other changes in form and detail may be made therein without departing from the spirit and scope.

What is claimed is:

1. A programmed digital computing device implemented system for determining a quantitative measure of qualitative usability of related Web pages, comprising:
   a Web server to maintain related Web pages that each include at least one hyperlink referencing and proximal cues describing distal content in another such related Web page;
   a storage device to store an information goal comprising one or more keywords;
   a processor comprising:
      an input module configured to identify a target Web page within the Web pages;
      a network generation module to generate an activation network, comprising:
      a graphing module to build a directed graph comprising nodes corresponding to the Web pages and arcs corresponding to the hyperlinks; and
      a weighting module to assign a weight to each arc in the directed graph to represent a probability of traversal of the corresponding hyperlink based on a relatedness of keywords in the information goal to the proximal cues included in each of the Web pages;
      a simulator module to simulate user flow through the Web pages comprising:
         a selector module configured to select a starting node from the directed graph;
         a counter module to set a count of traversals; and
         a navigation module to navigate iteratively through the activation network for the set traversal count;
      a satisfaction module to compute the probability that the target Web page has been found after the traversals as a satisfaction measure, comprising:
         a conversion module to convert the node corresponding to the target Web page to a termination node; and
         a calculating module to calculate a product of the weights of the arcs along each traversal through the activation network to the node corresponding to the target Web page and to sum the product of the weights of the traversals; and
      an evaluation module to determine a metric as a quantitative measure of usability, comprising:
         a data structure module to represent the probability of traversing each such hyperlink in light of the information goal as a data structure; and
         a metric module to guide the traversal through the activation network based on each such probability wherein the probability is chosen from at least one of the probability having the highest value at each such node in the traversal and the probability having the best value in light of reaching the information goal at each such node in the traversal is chosen;
      a display to display the quantitative measure of usability, and
      a comparison module to compare the satisfaction measure to the quantitative measure of usability to determine an upper bound for the information goal.

2. A system according to claim 1, wherein a decay factor is applied to simulate user attrition from the Web pages.

3. A system according to claim 1, further comprising:
   a simulation engine to simulate usage of the Web pages by a population of users, comprising iteratively traversing through the activation network.

4. A system according to claim 1, wherein a greedy algorithm is applied to the activation network.

5. A system according to claim 1, wherein a single-source shortest path algorithm is applied to the activation network.

6. A system according to claim 1, further comprising:
   a simulation engine to determine the quantitative measure in accordance with the equation:

$$A_i = A_{i-1} \cdot S$$

where S is a starting activation vector representing the activation network and $A_i$ is a successive activation vector determined after i traversals.

7. A system according to claim 1, further comprising:
   a simulation engine to determine the quantitative measure with a decay factor in accordance with the equation:

$$A = \alpha A_{i-1} \cdot S$$

where S is a starting activation vector representing the activation network, $A_i$ is a successive activation vector determined after i traversals, and $\alpha$ is a decay factor.

8. A system according to claim 1, further comprising:
   a simulation engine to determine the quantitative measure with a growth constant in accordance with the equation:

$$A_i = A_{i-1} \cdot S + E$$

where S is a starting activation vector representing the activation network, $A_i$ is a successive activation vector determined after i traversals, and E is a growth constant.

9. A method for determining a quantitative measure of qualitative usability of related Web pages, comprising:
   accepting related Web pages that each include at least one hyperlink referencing and proximal cues describing distal content in another such related Web page;
   specifying an information goal comprising one or more keywords;
   identifying a target Web page within the Web pages;
   forming an activation network, comprising:
      building a directed graph comprising nodes corresponding to the Web pages and arcs corresponding to the hyperlinks; and assigning a weight to each arc in the directed graph to represent a probability of traversal of the corresponding hyperlink based on a relatedness of keywords in the information goal to the proximal cues included in each of the Web pages;

simulating user flow through the Web pages comprising:
selecting a starting node from the directed graph;
setting a count of traversals to perform;
navigating iteratively through the activation network from the starting node for the set traversal count; and
computing the probability that the target Web page has been found after the traversals as a satisfaction measure, comprising:
converting the node corresponding to the target Web page to a termination node;
calculating a product of the weights of the arcs along each traversal through the activation network to the node corresponding to the target Web page; and
summing the product of the weights of said traversals;
determining a metric as a quantitative measure of usability, comprising:
representing the probability of traversing each such hyperlink in light of the information goal as a data structure; and
guiding the traversal through the activation network based on each such probability wherein the probability is chosen from at least one of the probability having the highest value at each such node in the traversal and the probability having the best value in light of reaching the information goal at each such node in the traversal is chosen;
displaying the quantitative measure of usability, and
comparing the satisfaction measure to the quantitative measure of usability to determine an upper bound for the information goal.

10. A method according to claim 9, further comprising:
applying a decay factor to simulate user attrition from the Web pages.

11. A method according to claim 9, further comprising:
simulating usage of the Web pages by a population of users, comprising iteratively traversing through the activation network.

12. A method according to claim 9, further comprising:
applying a greedy algorithm to the activation network.

13. A method according to claim 9, further comprising:
applying a single-source shortest path algorithm to the activation network.

14. A method according to claim 9, further comprising:
determining the quantitative measure in accordance with the equation:

$$A_i = A_{i-1} \cdot S$$

where S is a starting activation vector representing the activation network and $A_i$ is a successive activation vector determined after i traversals.

15. A method according to claim 9, further comprising:
determining the quantitative measure with a decay factor in accordance with the equation:

$$A_i = \alpha A_{i-1} \cdot S$$

where S is a starting activation vector representing the activation network, $A_i$ is a successive activation vector determined after i traversals, and $\alpha$ is a decay factor.

16. A method according to claim 9, further comprising:
determining the quantitative measure with a growth constant in accordance with the equation:

$$A_i = A_{i-1} \cdot S + E$$

where S is a starting activation vector representing the activation network, $A_i$ is a successive activation vector determined after i traversals, and E is a growth constant.

17. A programmed digital computing device holding code for performing the method according to claim 9.

18. A programmed digital computing device implemented system for determining a quantitative measure of qualitative usability of Web pages in a Web site, comprising:
a Web server to maintain a Web site comprising a plurality of Web pages, each Web page including content and at least one hyperlink referencing another Web page with proximal cues describing distal content included in the another Web page;
a storage device to store an information goal comprising one or more keywords;
a processor comprising:
an input module configured to identify a target Web page from among the Web pages in the Web site;
a network generation module to generate a logically-defined activation network, comprising:
a directed graph built with nodes corresponding to the Web pages and arcs corresponding to the hyperlinks between the Web pages; and
a weight assigned to each arc in the directed graph to represent a probability of traversal of the corresponding hyperlink based on a relatedness of keywords in the information goal to the proximal cues included in the Web pages;
a simulator module to simulate user flow through the Web pages of the Web site comprising:
a selector module configured to select a starting node from the directed graph;
a counter module to set a count of traversals;
a navigation module to navigate iteratively through the activation network for the set traversal count;
a satisfaction module to evaluate the traversals through the activation network to the node corresponding to the target Web page as a satisfaction measure; and
a conversion module to convert the node corresponding to the target Web page to a termination node;
an evaluation module to determine a metric as a quantitative measure of usability, comprising:
a data structure module to represent the probability of traversing each such hyperlink in light of the information goal as a data structure; and
a metric module to guide the traversal through the activation network based on each such probability wherein the probability is chosen from at least one of the probability having the highest value at each such node in the traversal and the probability having the best value in light of reaching the information goal at each such node in the traversal is chosen; and
simulation engine to determine the quantitative measure in accordance with at least one equation selected from the set, comprising:

$$A_i = A_{i-1} \cdot S;$$

$$A_i = \alpha A_{i-1} \cdot S; \text{ and}$$

$$A_i = A_{i-1} \cdot S + E$$

where S is a starting activation vector representing the activation network, $A_i$ is a successive activation vector determined after i traversals, $\alpha$ is a decay factor, and E is a growth constant, and a comparison module to compare the satisfaction measure to the quantitative measure of usability to determine an upper bound for the information goal.

19. A method for determining a quantitative measure of qualitative usability of Web pages in a Web site, comprising:

accepting a Web site comprising a plurality of Web pages, each Web page including content and at least one hyperlink referencing another Web page with proximal cues describing distal content included in the another Web page;

specifying an information goal comprising one or more keywords;

identifying a target Web page from among the Web pages in the Web site;

forming a logically-defined activation network, comprising:

building a directed graph with nodes corresponding to the Web pages and arcs corresponding to the hyperlinks between the Web pages; and assigning a weight to each arc in the directed graph to represent a probability of traversal of the corresponding hyperlink based on a relatedness of keywords in the information goal to the proximal cues included in the Web pages;

simulating user flow through the Web pages comprising:

selecting a starting node from the directed graph;

setting a count of traversals to perform;

navigating iteratively through the activation network from the starting node for the set traversal count; and evaluating the traversals through the activation network to the node corresponding to the target Web page as a satisfaction measure; and converting the node corresponding to the target Web page to a termination node;

determining a metric as a quantitative measure of usability, comprising:

representing the probability of traversing each such hyperlink in light of the information goal as a data structure; and guiding the traversal through the activation network based on each such probability wherein the probability is chosen from at least one of the probability having the highest value at each such node in the traversal and the probability having the best value in light of reaching the information goal at each such node in the traversal is chosen; and determining the quantitative measure in accordance with at least one equation selected from the set, comprising:

$A_i = A_{i-1} \cdot S;$ $A_i = \alpha A_{i-1} \cdot S;$ and $A_i = A_{i-1} \cdot S + E$ where S is a starting activation vector representing the activation network, $A_i$ is a successive activation vector determined after i traversals, $\alpha$ is a decay factor, and E is a growth constant; and comparing the satisfaction measure to the quantitative measure of usability to determine an upper bound for the information goal.

20. A programmed digital computing device holding code for performing the method according to claim 19.

* * * * *